(12) United States Patent
Huang (10) Patent No.: US 8,708,542 B2
(45) Date of Patent: Apr. 29, 2014

(54) BACKLIGHT MODULE AND LIQUID CRYSTAL DISPLAY DEVICE

(75) Inventor: Jianfa Huang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 155 days.

(21) Appl. No.: 13/265,141

(22) PCT Filed: Jul. 20, 2011

(86) PCT No.: PCT/CN2011/077398
§ 371 (c)(1),
(2), (4) Date: Oct. 19, 2011

(87) PCT Pub. No.: WO2012/167484
PCT Pub. Date: Dec. 13, 2012

(65) Prior Publication Data
US 2012/0314447 A1    Dec. 13, 2012

(30) Foreign Application Priority Data

Jun. 8, 2011  (CN) .......................... 2011 1 0152562

(51) Int. Cl.
*F21V 13/04*    (2006.01)
*F21V 13/12*    (2006.01)
*G02F 1/13357*  (2006.01)

(52) U.S. Cl.
USPC ........... 362/608; 362/606; 362/609; 362/612; 362/615

(58) Field of Classification Search
USPC ......................................... 362/602, 608, 611
See application file for complete search history.

(56) References Cited

U.S. PATENT DOCUMENTS

| | | | | |
|---|---|---|---|---|
| 6,976,779 | B2 * | 12/2005 | Ohtsuki et al. | 362/608 |
| 7,663,154 | B2 * | 2/2010 | Chou et al. | 257/99 |
| 7,690,831 | B2 * | 4/2010 | Mori et al. | 362/621 |
| 2004/0174694 | A1 * | 9/2004 | Huang et al. | 362/31 |
| 2007/0081319 | A1 * | 4/2007 | Fang et al. | 362/19 |
| 2008/0062715 | A1 * | 3/2008 | Park et al. | 362/612 |
| 2010/0061119 | A1 * | 3/2010 | Guo | 362/625 |

FOREIGN PATENT DOCUMENTS

| CN | 1504803 A | 6/2004 |
|---|---|---|
| CN | 101349778 A | 1/2009 |

* cited by examiner

*Primary Examiner* — Sikha Roy
(74) *Attorney, Agent, or Firm* — Mark M. Friedman (57) ABSTRACT

A backlight module and a liquid crystal display device are provided. The backlight module at least comprises a light source assembly and a light guide plate. The light source assembly provides multiple groups of parallel incident beams having different intensity. A light incidence surface is used to receive the parallel incident beams and then refract them to be multiple groups of parallel refracted beams. The parallel refracted beams can directly arrive at a bottom surface, and be emitted out from a light-emitting surface after reflected and dispersed by the bottom surface. There forms an included angle between a normal of the light incidence surface and the parallel incident beams, and the included angle is an acute angle. The backlight module and the liquid crystal display device of the present invention can reduce the reflection times of light in the light guide plate for improving the light use efficiency.

7 Claims, 5 Drawing Sheets

BACKLIGHT MODULE AND LIQUID CRYSTAL DISPLAY DEVICE

BACKGROUND OF THE INVENTION

1. Field of the Invention

The present invention relates to a backlight module and a liquid crystal display device, and more particularly to a backlight module and a liquid crystal display device adopting a new type light guide plate for improving the light use efficiency.

2. Description of the Prior Art

A backlight module is one of the important parts of a liquid crystal device. The liquid crystal can not emit light by self, so the function of the backlight module is to provide a uniform and high luminance light source for a liquid crystal display panel (LCD Panel) of the liquid crystal device, thereby making the LCD Panel normally display images. Generally, the backlight module mainly includes a light source, a reflect sheet, a light guide plate, multiple optical films (such as a diffuse sheet, a prism sheet and so on), a plastic frame and so on. The backlight module may be divided into a side illumination backlight module and a direct illumination backlight module according to the position of the light source located in the backlight module. The beam generated by the light source of the side illumination backlight module first enters into the light guide plate from a light incidence surface, then is multiple reflected by inside surfaces of the light guide plate and comes out from a light-emitting surface, and finally arrives at the optical films.

Therefore, in the side illumination backlight module, the light guide plate is an important element, which can affect the light transmission efficiency in the backlight module and the liquid crystal display device. Please refer to FIG. 1, in a prior side illumination backlight module 9, a light incidence surface 91 of a light guide plate 90 is generally upright for receiving the beam provided by a light source 91. In the inside of the light guide plate 90, the beam provided by the light source 91 is transmitted forward in the way of total reflection. Then the beam entering into the inside of the light guide plate 90 can be dispersed by circular or square mesh points printed on a bottom surface 92 of the light guide plate 90. And finally the beam entering into the inside of the light guide plate 90 can be emitted from a light-emitting surface 93 of the light guide plate 90.

Figure 1:
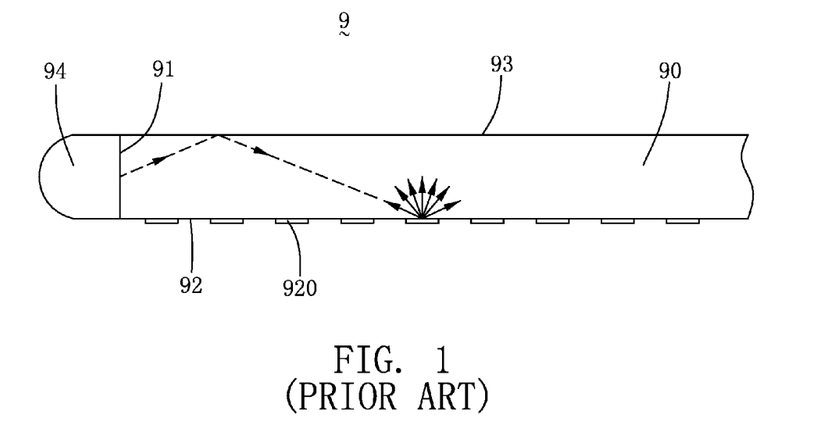
FIG. 1 is a schematic view of the structure and a partial light path of a light guide plate adopted by a backlight module in the prior art.

Obviously, after entering into the light guide plate 90, the beam is multiple reflected. By simulating, it can be found that in a 42 inches backlight module, the beam emitted from a three millimeters thickness light guide plate can be generally reflected about two hundred times by a top surface of the light guide plate. In a larger size backlight module, the reflection time is more. Therefore, when the beam passes through the light guide plate, there exist two main losses. One loss is that the light guide plate can absorb light by self, and the other loss is that the printing ink for forming the mesh points can absorb light. The data shows that the reflectivity of the mesh points is about 97 percent. Namely, the beam can lose 3 percent of the light energy per reflection on the mesh point. If the beam is reflected five times by the mesh points, it will lose 14.2 percent of the light energy.

It can be seen that the light transmission efficiency and the light use efficiency of the light guide plate are low because the light guide plate can absorb light by self and the mesh points of the light guide plate can absorb light in short-wave band. Moreover, the printing ink of the mesh points can not uniformly absorb light. For example, it can absorb blue-green light wave band more than other bands that will results in the color of the whole top surface of the light guide plate being uniform. Namely, more serious chromatism may be occurred on the top surface of the light guide plate. For example, the factual color temperature of one end of the light guide plate near the light source is higher than the theoretical color temperature thereof, and the factual color thereof is biased toward blue. But the factual color temperature of the other end of the light guide plate far from the light source is too low.

Hence, it is needed to provide a new backlight module and a new liquid crystal display device adopting a new type light guide plate to solve the problem existed in the prior art.

BRIEF SUMMARY OF THE INVENTION

The present invention provides a backlight module and a liquid crystal display device to solve the prior art problems of the loss of light energy caused by the multiple reflections of light in a light guide plate.

A primary object of the present invention is to provide a backlight module, wherein a parallel incident beam generated by a light source assembly can be directly refracted onto a bottom surface or a light-emitting surface of a light guide plate by a light incidence surface of the light guide plate, and be emitted out from the light-emitting surface of the light guide plate after being reflected and dispersed by the bottom surface, or be directly emitted out of the light guide plate after being reflected and dispersed by the light-emitting surface, so that reducing the reflection times of light in the light guide plate and improving the light use efficiency.

Another object of the present invention is to provide a liquid crystal display device, being capable of improving the light use efficiency, the luminance and the displaying quality.

The other object and the advantage of the present invention may be further understood from the technical features disclosed by the present invention.

To achieve the aforementioned object or other objects of the present invention, the present invention adopts the following technical solution. A backlight module at least comprises a light source assembly and a light guide plate. The light source assembly provides multiple groups of parallel incident beams having different intensity. The light guide plate comprises a light incidence surface facing the light source assembly, a bottom surface adjacent to the light incidence surface, and a light-emitting surface opposite to the bottom surface. The light incidence surface is used to receive the parallel incident beams from the light source assembly and to refract the parallel incident beams to be multiple groups of parallel refracted beams corresponding to the parallel incident beams onto the bottom surface. The parallel refracted beams are emitted out from the light-emitting surface after being reflected and dispersed by the bottom surface. The bottom surface of the light guide plate is divided into multiple regions, which are corresponding to the parallel incident beams, to separately receive the parallel refracted beams corresponding to the parallel incident beams.

In one embodiment of the present invention, the light incidence surface is an inclined surface. The bottom surface forms a plurality of mesh points or micro-structures thereon. The length of the bottom surface is greater than that of the light-emitting surface along the length direction of the light guide plate. There forms an included angle $\alpha$ between one diagonal plane of the light guide plate and the bottom surface, an included angle $\beta$ between the light incidence surface and a vertical line, and an included angle $\gamma$ between the parallel incident beams and a normal of the light incidence surface. These angles of the light guide plate satisfy the condition:

$\sin(\gamma) = n \sin(\beta-\alpha)$, where n represents a refractive index of the light guide plate being relative to air.

In one embodiment of the present invention, the parallel incident beams are horizontally incident on the light incidence surface, and $\gamma = \beta$.

In one embodiment of the present invention, the light incidence surface is an upright surface. The bottom surface forms a plurality of mesh points or micro-structures thereon. There forms an included angle $\gamma_2$ between the parallel incident beams and a normal of the light incidence surface and an included angle $\alpha_2$ between one diagonal plane of the light guide plate and the bottom surface. The light guide plate satisfies the condition: $\sin(\gamma_2) = n \sin(\alpha_2)$, where n represents a refractive index of the light guide plate being relative to air.

In one embodiment of the present invention, the light source assembly comprises a light-emitting unit and a light path-adjusting element. The light-emitting unit employs one or more light-emitting diodes, and the light path-adjusting element employs one or more condensing lenses or cylindrical lenses. The luminance of the parallel incident beams provided by the light source assembly is gradually increased from bottom to top along the light incidence surface of the light guide plate. The more the parallel incident beams are near to the lower of the light incidence surface of the light guide plate, the weaker the light intensity thereof is. And the more the parallel incident beams are near to the upper of the light incidence surface of the light guide plate, the stronger the light intensity thereof is.

To achieve the aforementioned object or other objects of the present invention, the present invention also adopts the following technical solution. A backlight module at least comprises a light source assembly and a light guide plate. The light source assembly provides multiple groups of parallel incident beams having different intensity. The light guide plate comprises a light incidence surface facing the light source assembly, a bottom surface adjacent to the light incidence surface, and a light-emitting surface opposite to the bottom surface. The light incidence surface is used to receive the parallel incident beams from the light source assembly and to refract the parallel incident beams to be multiple groups of parallel refracted beams corresponding to the parallel incident beams onto the light-emitting surface. The parallel refracted beams are emitted out from the light-emitting surface after being reflected and dispersed by the light-emitting surface. The light-emitting surface of the light guide plate is divided into multiple regions, which are corresponding to the parallel incident beams, to separately receive the parallel refracted beams corresponding to the parallel incident beams.

In one embodiment of the present invention, the light incidence surface is an inclined surface. The light-emitting surface forms a plurality of mesh points or micro-structures thereon. The length of the bottom surface is less than that of the light-emitting surface along the length direction of the light guide plate. The light guide plate satisfies the following condition:

$$\sin(\gamma_1) = n \sin(\beta_1 - \alpha_1)$$

where $\gamma_1$ represents an included angle between the parallel incident beams and a normal of the light incidence surface, $\beta_1$ represents an included angle between the light incidence surface and a vertical line, $\alpha_1$ represents an included angle between one diagonal plane of the light guide plate and the light-emitting surface, and n represents a refractive index of the light guide plate being relative to air.

In one embodiment of the present invention, the parallel incident beams are horizontally incident on the light incidence surface, and $\gamma_1 = \beta_1$.

In one embodiment of the present invention, the light incidence surface is an upright surface. The light-emitting surface forms a plurality of mesh points or micro-structures thereon. There forms an included angle $\gamma_3$ between the parallel incident beams and a normal of the light incidence surface and an included angle $\alpha_3$ between one diagonal plane of the light guide plate and the light-emitting surface. The light guide plate satisfies the condition: $\sin(\gamma_3) = n \sin(\alpha_3)$, where n represents a refractive index of the light guide plate being relative to air.

To achieve the aforementioned object or other objects of the present invention, the present invention also adopts the following technical solution. A liquid crystal display device comprises a backlight module. The main components of the backlight module adopt the structures having above features.

Comparing with the prior art, the backlight module and the liquid crystal display device of the present invention adopt the new type light guide plate. A parallel incident beam generated by a light source assembly can be directly refracted onto a bottom surface or a light-emitting surface of a light guide plate by a light incidence surface of the light guide plate, and then be emitted out from the light-emitting surface of the light guide plate after being reflected and dispersed by the bottom surface, or be directly emitted out of the light guide plate after being reflected and dispersed by the light-emitting surface, so that reducing the reflection times of light in the light guide plate and improving the light use efficiency.

DETAILED DESCRIPTION OF THE PREFERRED EMBODIMENTS

For more clearly and easily understanding the object, the feature and the advantage of the present invention, the following text will take a preferred embodiment of the present invention with reference to the accompanying drawings for detail description as follows. Moreover, directional terms mentioned in the present invention, such as "top", "bottom", "front", "back", "left", "right", "inside", "outside", "side" etc., are only used with reference to the orientation of the accompanying drawings. Therefore, the used directional terms are intended to illustrate, but not to limit, the present invention.

Figure 2:
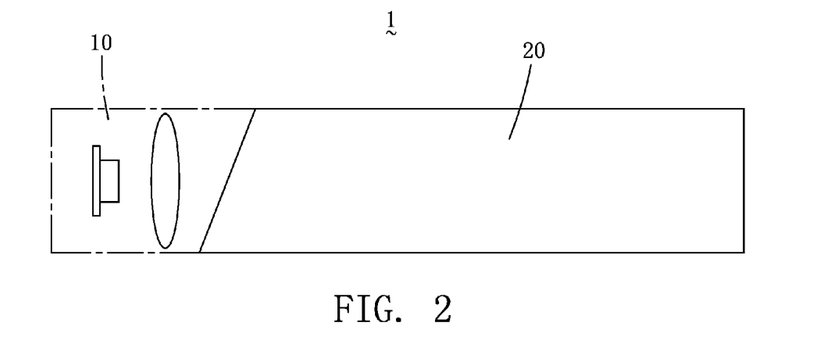
FIG. 2 is a structure schematic view of main components of one embodiment of a backlight module in the present invention.

Please refer to FIG. 2, which shows a structure schematic view of main components of one embodiment of a backlight module 1 in the present invention and only shows a part of the backlight module 1 being related to the present invention, such as a light source assembly 10 and a light guide plate 20. Concerning other structures of the backlight module 1, such as optical films, a plastic frame or a metal frame and so on, they have been omitted for simplifying the description due to similar to the prior backlight module.

Figure 3:
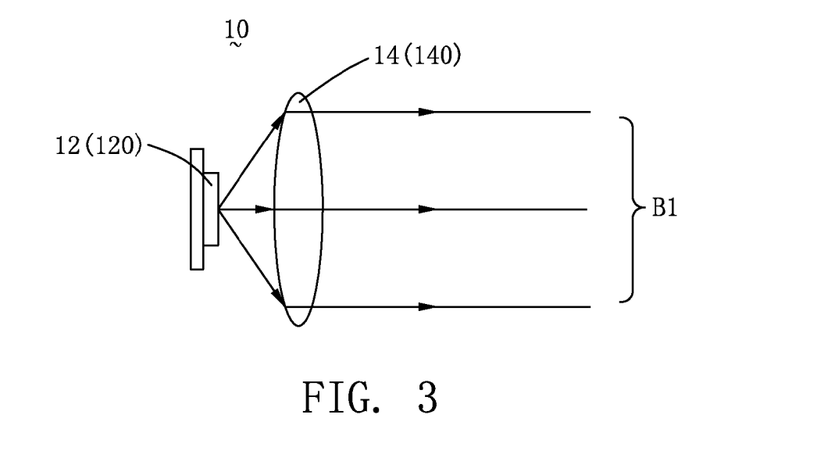
FIG. 3 is a structure schematic view of one embodiment of a light source assembly of the backlight module in the present invention.
Figure 4:
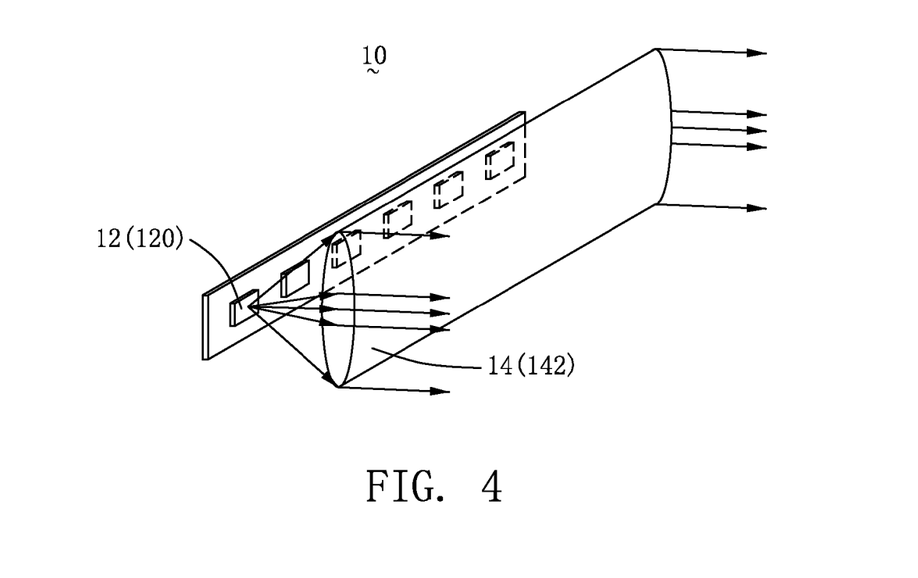
FIG. 4 is a structure schematic view of the other embodiment of the light source assembly of the backlight module in the present invention.

Please refer to FIG. 3, which shows a structure schematic view of one embodiment of the light source assembly 10 of the backlight module in the present invention. The light source assembly 10 can provide one group of parallel incident beam B1. The light source assembly 10 at least includes a light-emitting unit 12 and a light path-adjusting element 14. The light-emitting unit 12 may adopt one light-emitting diode 120. Because the beam generated by the light-emitting diode 120 is a diverging beam, the light path-adjusting element 14 needs to adopt one condensing lens 140, which can adjust the diverging beam generated by the light-emitting diode 120 to be the parallel incident beam when the light-emitting diode 120 is placed on a focus plane of the condensing lens 140. Of course, the light-emitting unit 12 also may adopt multiple light-emitting diodes 120 (as shown in FIG. 4) being arranged side by side, but the light path-adjusting element 14 needs to adopt one cylindrical lens 142, which can adjust the diverging beams generated by these light-emitting diodes 120 to be the parallel incident beams when these light-emitting diodes 120 are placed on a focus plane of the cylindrical lens 142.

Figure 7:
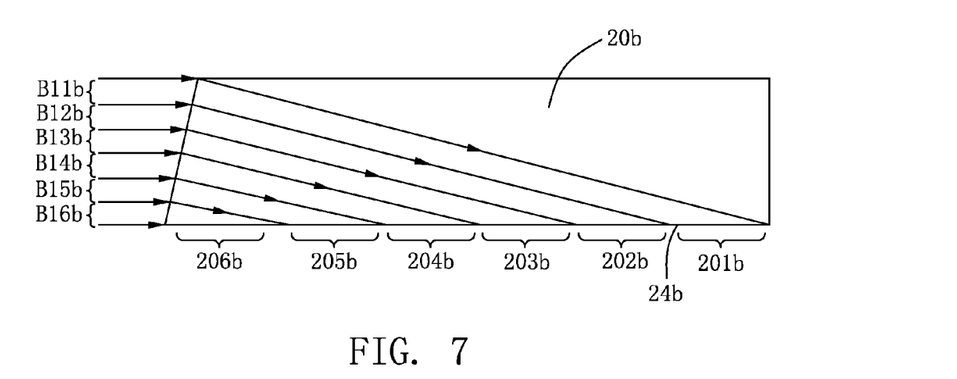
FIG. 7 is a schematic view of the structure and a partial light path of a third embodiment of the light guide plate of the backlight module in the present invention.

It can be thought of that the light source assembly 10 also can be modified for providing multiple groups of parallel incident beams B11b-B16b (as shown in FIG. 7) having different illumination intensity. For example, when designing, one light-emitting unit 12 and one light path-adjusting element 14 are regarded as a light-emitting group for projecting one group of parallel incident beam. The number of the light-emitting unit 12 and the light path-adjusting element 14 may be increased to increase the number of the light-emitting group according to the needing, so that projecting multiple groups of parallel incident beams having different intensity. Moreover, the light-emitting unit 12 of the light source assembly 10 also may adopt other type light sources in addition to the light-emitting diode 120. If the selected light source generates non-parallel beam, the light source assembly 10 will employ the light path-adjusting element 14 for adjusting the non-parallel beam to be the parallel beam. But if the selected light source can directly generate the parallel beam, the light source assembly 10 need not employ the light path-adjusting element 14. Because the selection of the light sources is not an emphasis of the present invention, they are not listed one by one herein.

The following will detailedly describe the specific design of the light guide plate 20 of the present invention.

Figure 5:
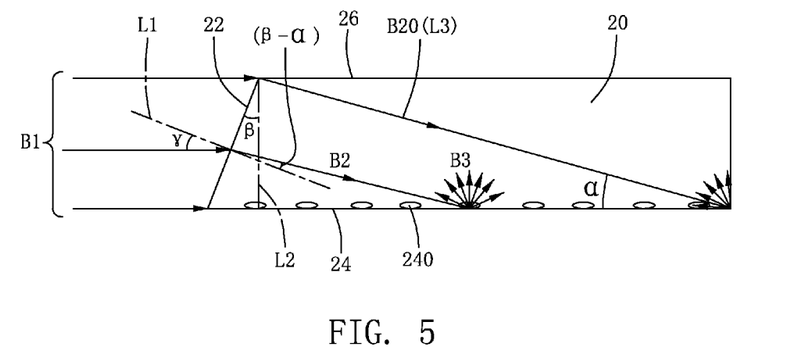
FIG. 5 is a schematic view of the structure and a partial light path of a first embodiment of a light guide plate of the backlight module in the present invention.

Please refer to FIG. 5, which shows a schematic view of the structure and a partial light path of a first embodiment of the light guide plate 20 of the backlight module in the present invention, the light guide plate 20 includes a light incidence surface 22, a bottom surface 24 and a light-emitting surface 26. The light incidence surface 22 faces the light source assembly 10 to receive the parallel incident beam B1 from the light source assembly 10. There forms an included angle γ between a normal L1 of the light incidence surface 22 and the parallel incident beam B1, and the included angle γ is an acute angle. In other words, the parallel incident beam B1 is incident on the light incidence surface 22 at the included angle γ. Then the parallel incident beam B1 is refracted to be one group of parallel refracted beam B2. The parallel refracted beam B2 directly arrives at the bottom surface 24. The bottom surface 24 is adjacent to the light incidence surface 22 to receive the parallel refracted beam B2 from the light incidence surface 22, and to reflect and disperse the parallel refracted beam B2. The light-emitting surface 26 is adjacent to the light incidence surface 22 to project the light rays B3, which are formed after the parallel refracted beam B2 being reflected and dispersed by the bottom surface 24, out of the light guide plate 20.

In the first embodiment shown in FIG. 5, the light incidence surface 22 of the light guide plate 20 is an inclined surface. Now, the length of the bottom surface 24 is greater than that of the light-emitting surface 26 along the length direction of the light guide plate 20. There forms an included angle β between the inclined surface (namely the light incidence surface 22) and a vertical line L2, and the included angle β is an acute angle. In the first embodiment shown in FIG. 5, the parallel incident beam B1 is horizontally incident on the inclined surface. There forms the included angle γ between the normal L1 of the light incidence surface 22 and the parallel incident beam B1, and an included angle α between the parallel refracted beam B2 and the bottom surface 24.

In the first embodiment shown in FIG. 5, according to the theory of optical paths and the relationship of an incidence angle and a refraction angle, it can be obtained that the light guide plate 20 needs to satisfy the following optical condition:

$$\sin(\gamma) = n \sin(\beta - \alpha)$$

where α represents the included angle between the parallel refracted beam B2 and the bottom surface 24, β represents the included angle between the light incidence surface 22 and the vertical line L2, γ represents the included angle between the normal L1 of the light incidence surface 22 and the parallel incident beam B1, and n represents a refractive index of the light guide plate 20 being relative to air. By the design of the light guide plate 20, the parallel refracted beam B2 can directly arrive at the bottom surface 24.

Although the parallel incident beam B1 is horizontally incident on the light incidence surface 22 in the first embodiment shown in FIG. 5, actually it can not be only limited to the horizontal incident way. For example, the parallel incident beam B1 may be inclined incident on the light incidence surface 22 of the inclined shape. It can be obtained that the light guide plate 20 still needs to satisfy the above optical conditions.

Moreover, in the first embodiment shown in FIG. 5 or other embodiments, if the light guide plate 20 wants to realize the object of the uniform luminance, the parallel refracted beam B2 must arrive at and cover the whole surface region of the bottom surface 24. Accordingly, the included angle α is equal to the included angle between one diagonal plane L3 of the light guide plate 20 and the bottom surface 24. Actually, one longest refraction ray B20 of the parallel refracted beam B2, which is transmitted to the farthest, is superposed with the one diagonal plane L3 of the light guide plate 20.

Hence, when actually designing, the included angles α and β are determined by the actual structure of the light guide plate 20. When the values of the included angles α and β are modified according to the actual structure of the light guide plate 20, the included angle γ may be varied with the included angles α and β, and then the incident direction of the parallel incident beam B1 can be determined by the included angle γ.

In the first embodiment shown in FIG. 5, the design of the light guide plate 20 also needs to notice that the transmission distances of the parallel refracted beam B2 in the light guide plate 20 are different. For example, a refraction ray transmitted to the farthest is the longest refraction ray B20, which can arrive at a far right of the light guide plate 20, and a refraction ray transmitted to the nearest can arrive at a far left of the light guide plate 20. Due to the light loss in the light transmission course, this will result in the light guide plate 20 not providing the uniform luminance. For example, the more the refraction ray is near to the left of the light guide plate 20, the less the light intensity thereof is lost because of the light transmission distance thereof being shorter, that results in the left luminance of the light guide plate 20 being higher. But the more the refraction ray is near to the right of the light guide plate 20, the more the light intensity thereof is lost because of the light transmission distance thereof being longer, that results in the right luminance of the light guide plate 20 being darker. Therefore, by adjusting the light source assembly 10, the uniform luminance of the light guide plate 20 can be adjusted. For example, adjusting the light source assembly 10 can make the luminance of the parallel incident beam B1 provided by it be gradually increased from bottom to top, wherein the more the parallel incident beam B1 is near to the lower of the light incidence surface 22 of the light guide plate 20, the weaker the light intensity thereof is. But the more the parallel incident beam B1 is near to the upper of the light incidence surface 22 of the light guide plate 20, the stronger the light intensity thereof is, so that preventing the difference of the light transmission distances from effecting the luminance uniformity of the light guide plate 20. As concerning which mode can be adopted to modify the light source assembly 10 for adjusting the light intensity of the parallel incident beam B1, it can be selected according to the actual demand. For example, increasing the light source intensity of the upper of the light source assembly 10 can increase the radiation intensity on the upper of the light guide plate 20, or decreasing the light source intensity of the lower of the light source assembly 10 can decrease the radiation intensity on the lower of the light guide plate 20.

In the first embodiment shown in FIG. 5, in the parallel incident beam B1 provided by the light source assembly 10, the light intensity thereof near the upper of the light guide plate 20 is stronger, but the light intensity thereof near the lower of the light guide plate 20 is weaker. Of course, the mode for improving the luminance uniformity of the light guide plate 20 can not be only limited to this. For example, the luminance uniformity of the light guide plate 20 also can be realized by shortening the transmission path of the upper light rays of the light source assembly 10, or by extending the transmission path of the lower light rays of the light source assembly 10.

In the first embodiment shown in FIG. 5, the light-emitting surface 26 is a top surface of the light guide plate 20. The bottom surface 24 and the light-emitting surface 26 are separately located on two sides of the light incidence surface 22. The bottom surface 24 forms a plurality of mesh points or micro-structures 240 thereon, which can destroy the total reflection of the light rays, so that the parallel refracted beam B2 refracted on the bottom surface 24 can be reflected and dispersed onto the light-emitting surface 26 thereby reducing the reflection times of the light rays in the inside of the light guide plate 20.

Figure 6:
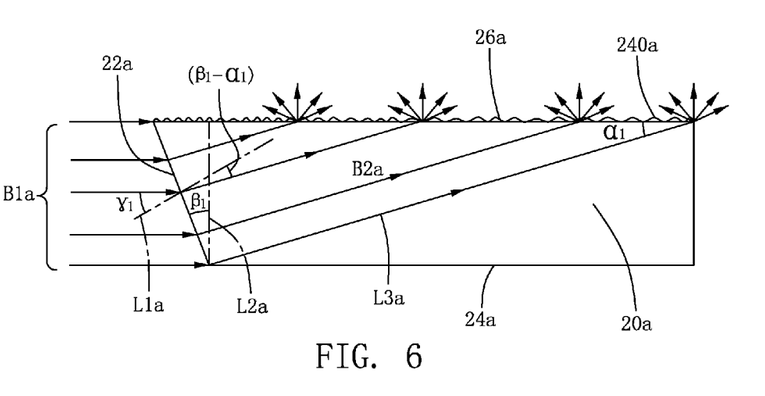
FIG. 6 is a schematic view of the structure and a partial light path of a second embodiment of the light guide plate of the backlight module in the present invention.

Please refer to FIG. 6, which shows a schematic view of the structure and a partial light path of a second embodiment of the light guide plate of the backlight module in the present invention. The light guide plate is indicated by reference numeral 20a. Like components of the light guide plate 20a and the light path of FIG. 6 with the light guide plate 20 and the light path of FIG. 5 share the same reference numeral with the addition of the suffix "a". In the second embodiment shown in FIG. 6, a light incidence surface 22a of the light guide plate 20a is still an inclined surface to be also used for receiving one group of parallel incident beam B1a being horizontally incident thereto, but the tilting direction of the light incidence surface 22a is opposite to that of the light incidence surface 22 of FIG. 5. As shown in FIG. 6, there forms an included angle $β_1$ between the inclined surface (namely the light incidence surface 22a) and a vertical line L2a, and the length of a bottom surface 24a of the light guide plate 20a is less than that of a light-emitting surface 26a. The difference between the light guide plate 20a of the second embodiment and the light guide plate 20 of the first embodiment is that mesh points or micro-structures 240a are not formed on the bottom surface 24a of the light guide plate 20a, but formed on the light-emitting surface 26a. Accordingly, the light-emitting surface 26a have the functions of dispersing and emitting the light rays.

The specific theory of optical paths in the light guide plate 20a of FIG. 6 is that the parallel incident beam B1a is incident into the light guide plate 20a from the light incidence surface 22a and is directly refracted onto the light-emitting surface 26a by the light incidence surface 22a to form one group of parallel refracted beam B2a, and the parallel refracted beam B2a is emitted out of the light guide plate 20a after being reflected and dispersed by the light-emitting surface 26a.

Understandably, regarding to the optical design theory of the light guide plate 20a shown in FIG. 6, it can refer to the optical design theory of the light guide plate 20 described in the above first embodiment. For example, in the second embodiment shown in FIG. 6, the light guide plate 20a still needs to satisfy the following optical condition:

$$\sin(γ_1) = n \sin(β_1 - α_1)$$

where $α_1$ represents an included angle between the parallel refracted beam B2a and the light-emitting surface 26a, namely the included angle $α_1$ is equal to an included angle between one diagonal plane L3a of the light guide plate 20a and the light-emitting surface 26a, $β_1$ represents an included angle between the light incidence surface 22a and a vertical line L2a, $γ_1$ represents an included angle between a normal L1a of the light incidence surface 22a and the parallel incident beam B1a, and n represents a refractive index of the light guide plate 20a being relative to air. By the design of the light guide plate 20a, the parallel refracted beam B2a can directly arrive at the light-emitting surface 26a.

Please refer to FIG. 7, which shows a schematic view of the structure and a partial light path of a third embodiment of the light guide plate of the backlight module in the present invention. The light guide plate is indicated by reference numeral 20b. Like components of the light guide plate 20b and the light path of FIG. 7 with the light guide plate 20 and the light path of FIG. 5 share the same reference numeral with the addition of the suffix "b". In the third embodiment shown in FIG. 7, the structure of the light guide plate 20b is generally same as that of the light guide plate 20 of the first embodiment. What changed is that a bottom surface 24b of the light guide plate 20b is divided into a plurality of regions. Specifically, in order to independently control the luminance of each longitudinal region of the light guide plate 20b to realize the local dimming technology, in one embodiment, the bottom surface 24b of the light guide plate 20b based on the needing may be divided into six regions, such as a first region 201b, a second region 202b, a third region 203b, a fourth region 204b, a five region 205b and a sixth region 206b. Similarly, a new light source assembly corresponding to the bottom surface 24b of the light guide plate 20b of the third embodiment should be capable of providing six groups of independent parallel incident beams B11b, B12b, B13b, B14b, B15b and B16b having different light intensity. The independently control of the six groups of independent parallel incident beams B11b, B12b, B13b, B14b, B15b and B16b can be realized by modifying the design of the light source assembly. Each group of the independent parallel incident beam can control one corresponding region of the light guide plate 20b, so that realizing six regions 201b-206b, the luminance of which can be independently controlled. Understandably, the number of the divided regions on the light guide plate 20b, the area of each region, and the feature of the corresponding independent parallel incident beam, all can be adjusted according to the actual optical demand.

Figure 8:
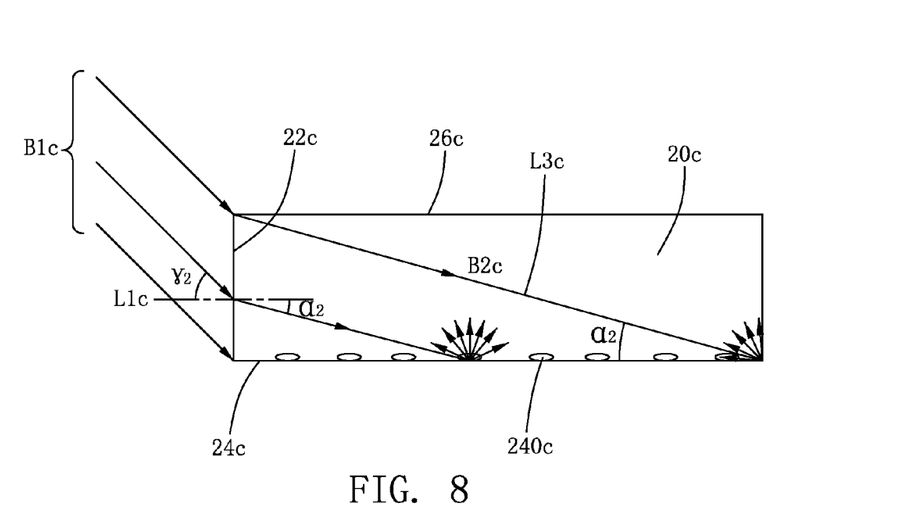
FIG. 8 is a schematic view of the structure and a partial light path of a fourth embodiment of the light guide plate of the backlight module in the present invention.

Please refer to FIG. 8, which shows a schematic view of the structure and a partial light path of a fourth embodiment of the light guide plate of the backlight module in the present invention. The light guide plate is indicated by reference numeral 20c. Like components of the light guide plate 20c and the light path of FIG. 8 with the light guide plate 20 and the light path of FIG. 5 share the same reference numeral with the addition of the suffix "c". In the fourth embodiment shown in FIG. 8, a light incidence surface 22c of the light guide plate 20c is cut to be an upright surface. Now one group of parallel incident beam B1c needs to be inclined incident on the light incidence surface 22c so that it can be refracted to be one group of parallel refracted beam B2c for directly arriving at a bottom surface 24c of the light guide plate 20c. The bottom surface 24c forms or disposes a plurality of mesh points or micro-structures 240c for reflecting and dispersing the parallel refracted beam B2c. There forms an included angle $\gamma_2$ between the parallel incident beam B1c and a normal L1c of the light incidence surface 22c, and forms an included angle $\alpha_2$ between the parallel refracted beam B2c and the bottom surface 24c, namely the included angle $\alpha_2$ is equal to the included angle between one diagonal plane L3c of the light guide plate 20c and the bottom surface 24c. The two included angles $\alpha_2$ and $\gamma_2$ still need to satisfy the condition: $\sin(\gamma_2)=n\sin(\alpha_2)$, where n represents a refractive index of the light guide plate 20c being relative to air. It needs to be noticed that, during the specific embodiment, the light advance path of the parallel incident beam B1c can be modified by adjusting the location of the light guide plate 20c relative to the light source assembly 10 of FIG. 2 so that the parallel incident beam B1c can be inclined incident on the light incidence surface 22c of the light guide plate 20c. Or adding other optical elements, such as reflection mirror and so on, also may modify the light advance path of the parallel incident beam B1c to adjust the incidence angle $\gamma_2$ of the parallel incident beam B1c on the light incidence surface 22c, thereby ensuring that the parallel incident beam B1c can be directly refracted to the bottom surface 24c.

In the fourth embodiment, because the bottom surface 24c of the light guide plate 20c and a light-emitting surface 26c are separately located on two sides of the light incidence surface 22c, the parallel incident beam B1c needs to be inclined incident to the light incidence surface 22c from the above of the light guide plate 20c. Understandably, in other embodiments, the structure of the light guide plate 20c of the fourth embodiment may be little modified to be a light guide plate 20d shown in FIG. 9 by referring to the light guide plate 20a of FIG. 6.

Figure 9:
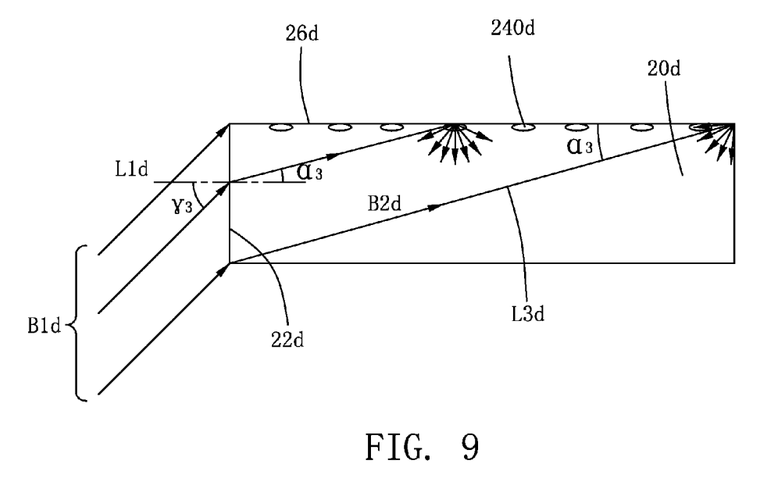
FIG. 9 is a schematic view of the structure and a partial light path of a fifth embodiment of the light guide plate of the backlight module in the present invention.

Like components of the light guide plate 20d shown in FIG. 9 with the light guide plate 20 shown in FIG. 5 share the same reference numeral with the addition of the suffix "d". One group of parallel incident beam B1d is inclined incident to a light incidence surface 22d from the above of the light guide plate 20d and then is refracted to be one group of parallel refracted beam B2d for directly arriving at a light-emitting surface 26d of the light guide plate 20d. The light-emitting surface 26d disposes a plurality of mesh points or micro-structures 240d. The parallel refracted beam B2d is directly emitted out of the light guide plate 20d after being reflected and dispersed by the light-emitting surface 26d. As shown in FIG. 9, there forms an included angle $\gamma_3$ between the parallel incident beam B1d and a normal L3d of the light incidence surface 22d, and forms an included angle $\alpha_3$ between the parallel refracted beam B2d and the light-emitting surface 26d, namely the included angle $\alpha_3$ is equal to the included angle between one diagonal plane L3d of the light guide plate 20d and the light-emitting surface 26d. The two included angles $\alpha_3$ and $\gamma_3$ still need to satisfy the condition: $\sin(\gamma_3)=n\sin(\alpha_3)$, where n represents a refractive index of the light guide plate 20d being relative to air.

In conclusion, the present backlight module 1 adopts a new type light guide plate 20, 20a, 20b, 20c and 20d to reduce the reflection times of the light rays in the light guide plate 20, 20a, 20b, 20c and 20d so that enhancing the light use efficiency.

In one embodiment, a liquid crystal display device of the present invention includes the backlight module 1 shown in FIG. 2, and the backlight module 1 adopts the light guide plate 20, 20a, 20b, 20c and 20d having above features and the light source assembly 10.

The present invention has been illustrated by the above embodiments, but the above embodiments only are used as examples for implementing the present invention. It must need to be pointed out that the exposed embodiments cannot limit the scope of the present invention. Oppositely, the modification and equivalent structures included within the spirit and scope of the appended claims are also included within the scope of the present invention.

I claim:

1. A liquid crystal display device, comprising a backlight module, the backlight module at least at least comprising a light source assembly and a light guide plate, characterized in that: the light source assembly comprising a plurality of light-emitting groups to provide multiple groups of parallel incident beams having different intensity, each of the light-emitting groups including a light-emitting unit and a light path-adjusting element, the light guide plate comprising a light incidence surface facing the light source assembly, a bottom surface adjacent to the light incidence surface and a light-emitting surface opposite to the bottom surface, the luminance of the parallel incident beams being gradually increased from bottom to top along the light incidence surface of the light guide plate, and the parallel incident beams being horizontally incident on the light incidence surface, which is an inclined surface, the inclined surface refracting the parallel incident beams to be multiple groups of parallel refracted beams corresponding to the parallel incident beams onto the bottom surface, the bottom surface forming a plurality of mesh points or micro-structures, and the parallel refracted beams being emitted out from the light-emitting surface after being reflected and dispersed by the mesh points or micro-structures of the bottom surface, wherein the bottom surface of the light guide plate is divided into multiple regions, which are corresponding to the parallel incident beams, to separately receive the parallel refracted beams corresponding to the parallel incident beams.

2. The liquid crystal display device as claimed in claim 1, characterized in that: the light-emitting unit employs multiple light-emitting diodes, but the light path-adjusting element employs one cylindrical lens, and the light-emitting diodes are located on a focus plane of the cylindrical lens.

3. The liquid crystal display device as claimed in claim 1, characterized in that: the length of the bottom surface is greater than that of the light-emitting surface along the length direction of the light guide plate, there forms an included angle α between one diagonal plane of the light guide plate and the bottom surface, an included angle β between the light incidence surface and a vertical line, and an included angle γ between the parallel incident beams and a normal of the light incidence surface, and these angles of the light guide plate satisfy the following condition:

$$\sin(\gamma) = n \sin(\beta - \alpha)$$

where n represents a refractive index of the light guide plate being relative to air.

4. A backlight module, at least comprising a light source assembly and a light guide plate, characterized in that: the light source assembly providing multiple groups of parallel incident beams having different intensity, the light guide plate comprising a light incidence surface facing the light source assembly, a bottom surface adjacent to the light incidence surface and a light-emitting surface opposite to the bottom surface, the light incidence surface being used to receive the parallel incident beams from the light source assembly and to refract the parallel incident beams to be multiple groups of parallel refracted beams corresponding to the parallel incident beams onto the bottom surface, the parallel refracted beams being emitted out from the light-emitting surface after being reflected and dispersed by the bottom surface, wherein the bottom surface of the light guide plate is divided into multiple regions, which are corresponding to the parallel incident beams, to separately receive the parallel refracted beams corresponding to the parallel incident beams;

wherein the light source assembly comprises a light-emitting unit and a light path-adjusting element, the light-emitting unit employing one or more light-emitting diodes, and the light path-adjusting element employing one or more condensing lenses or cylindrical lenses, the luminance of the parallel incident beams provided by the light source assembly being gradually increased from bottom to top along the light incidence surface of the light guide plate;

wherein the more the parallel incident beams are near to the lower of the light incidence surface of the light guide plate, the weaker the light intensity thereof is, and the more the parallel incident beams are near to the upper of the light incidence surface of the light guide plate, the stronger the light intensity thereof is.

5. The backlight module as claimed in claim 4, characterized in that: the light incidence surface is an inclined surface, the bottom surface forms a plurality of mesh points or microstructures thereon, the length of the bottom surface is greater than that of the light-emitting surface along the length direction of the light guide plate, there forms an included angle α between one diagonal plane of the light guide plate and the bottom surface, an included angle β between the light incidence surface and a vertical line, and an included angle γ between the parallel incident beams and a normal of the light incidence surface, and these angles of the light guide plate satisfy the following condition:

$$\sin(\gamma) = n \sin(\beta - \alpha)$$

where n represents a refractive index of the light guide plate being relative to air.

6. The backlight module as claimed in claim 5, characterized in that: the parallel incident beams are horizontally incident on the light incidence surface, and $\gamma = \beta$.

7. The backlight module as claimed in claim 4, characterized in that: the light incidence surface is an upright surface, the bottom surface forms a plurality of mesh points or microstructures thereon, there forms an included angle $\gamma_2$ between the parallel incident beams and a normal of the light incidence surface and an included angle $\alpha_2$ between one diagonal plane of the light guide plate and the bottom surface, and the light guide plate satisfies the following condition:

$$\sin(\gamma_2) = n \sin(\alpha_2)$$

where n represents a refractive index of the light guide plate being relative to air.

* * * * *